United States Patent
Sharda et al.

(10) Patent No.: US 9,395,797 B2
(45) Date of Patent: Jul. 19, 2016

(54) MICROCONTROLLER WITH MULTIPLE POWER MODES

(71) Applicants: Garima Sharda, Ghaziabad (IN); Carl Culshaw, Wigan (GB); Alan Devine, Paisley (GB); Akshay K. Pathak, Noida (IN); Alistair P. Robertson, Glasgow (GB)

(72) Inventors: Garima Sharda, Ghaziabad (IN); Carl Culshaw, Wigan (GB); Alan Devine, Paisley (GB); Akshay K. Pathak, Noida (IN); Alistair P. Robertson, Glasgow (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 274 days.

(21) Appl. No.: 14/321,838

(22) Filed: Jul. 2, 2014

(65) Prior Publication Data

US 2016/0004292 A1 Jan. 7, 2016

(51) Int. Cl.
*G06F 1/26* (2006.01)
*G06F 1/32* (2006.01)
*G06F 13/40* (2006.01)

(52) U.S. Cl.
CPC .............. *G06F 1/3243* (2013.01); *G06F 1/324* (2013.01); *G06F 1/3293* (2013.01); *G06F 13/4022* (2013.01); *G06F 1/3203* (2013.01)

(58) Field of Classification Search
CPC ..... G06F 1/324; G06F 1/3243; G06F 1/3293; G06F 13/4022
USPC .......................................................... 713/300
See application file for complete search history.

(56) References Cited

U.S. PATENT DOCUMENTS

| | | | |
|---|---|---|---|
| 7,925,900 B2 * | 4/2011 | Parks .................... | G06F 1/3203 712/1 |
| 7,982,498 B1 * | 7/2011 | Chen .................. | H03K 3/35613 326/21 |
| 8,010,822 B2 | 8/2011 | Marshall et al. | |
| 8,381,004 B2 | 2/2013 | Elnozahy et al. | |
| 8,543,857 B2 | 9/2013 | Therien | |
| 8,615,647 B2 * | 12/2013 | Hum ..................... | G06F 1/3203 712/32 |
| 8,832,478 B2 * | 9/2014 | Ananthakrishnan .... | G06F 1/324 713/320 |

(Continued)

OTHER PUBLICATIONS

Hattori, T., et al., "A Power Management Scheme Controlling 20 Power Domains for a Single-Chip Mobile Processor", International Solid-State Circuits Conference 2006—Digest of Technical Papers—IEEE International, Feb. 6-9, 2006.

(Continued)

*Primary Examiner* — Chun Cao
*Assistant Examiner* — Volvick Derose
(74) *Attorney, Agent, or Firm* — Charles E. Bergere

(57) ABSTRACT

A microcontroller operable in a high power mode and a low power unit (LPU) run mode includes primary and LPU domains, primary and LPU mode controllers, and primary and LPU clock generator modules. The primary domain includes a first set of circuits and a first set of cores. The LPU domain includes second and third sets of circuits, a second set of cores, and a switching module. In the high power mode, the switching module connects the first and second sets of cores to at least one of the first, second and third sets of circuits, while in the LPU run mode, the switching module isolates the LPU domain from the primary domain and activates a small microcontroller system (SMS) that includes the LPU domain, the LPU mode controller and the LPU clock generator module. The SMS has further low power modes within the LPU run mode.

21 Claims, 4 Drawing Sheets

(56) References Cited

U.S. PATENT DOCUMENTS

| | | | | |
|---|---|---|---|---|
| 8,832,483 B1* | 9/2014 | Chudgar | ............... | G06F 1/3293 |
| | | | | 713/320 |
| 9,021,284 B2* | 4/2015 | Freiwald | ............... | G06F 1/3293 |
| | | | | 713/300 |
| 2006/0212677 A1 | 9/2006 | Fossum | | |
| 2008/0074171 A1* | 3/2008 | Bhattacharya | ...... | H01L 27/0251 |
| | | | | 327/538 |
| 2009/0144571 A1* | 6/2009 | Tatsumi | ..................... | G06F 1/26 |
| | | | | 713/320 |
| 2010/0042858 A1* | 2/2010 | Padhye | ................. | G06F 1/3287 |
| | | | | 713/323 |
| 2011/0320766 A1 | 12/2011 | Wu | | |
| 2012/0187998 A1* | 7/2012 | Jarrar | ............. | H03K 19/018521 |
| | | | | 327/333 |
| 2013/0067259 A1* | 3/2013 | Freiwald | ............... | G06F 1/3293 |
| | | | | 713/323 |
| 2013/0073878 A1* | 3/2013 | Jayasimha | ............ | G06F 1/3287 |
| | | | | 713/300 |
| 2013/0124895 A1* | 5/2013 | Saha | ......................... | G06F 1/26 |
| | | | | 713/323 |
| 2013/0159776 A1* | 6/2013 | Gilday | ................ | G06F 11/3636 |
| | | | | 714/37 |
| 2014/0075218 A1* | 3/2014 | Bartling | ................. | G06F 13/00 |
| | | | | 713/320 |
| 2015/0095681 A1* | 4/2015 | Jouin | .................... | G06F 1/3243 |
| | | | | 713/323 |

OTHER PUBLICATIONS

Renesas Electronics America Inc., "Microcontrollers Solutions Enabling a Greener Society", DEVCON, Oct. 22-25, 2012, (http://www.renesasinteractive.com/file.php/1/CoursePDFs/DevCon_On-the-Road/DevCon_On-the-Road/Computing_Architecture/Microcontrollers%20Solutions%20Enabling%20a%20Greener%20Society.pdf).

* cited by examiner

MICROCONTROLLER WITH MULTIPLE POWER MODES

BACKGROUND OF THE INVENTION

The present invention relates generally to integrated circuits, and, more particularly, to a microcontroller that has multiple power modes.

A microcontroller unit (MCU) is a type of integrated circuit (IC) that has a plurality of components such as multiple processor cores and peripherals. MCUs are designed for specific applications and often are part of specific systems, such as automotive electronics systems and wireless communication devices. An MCU used in an automotive system may include multiple processor cores and peripherals such as timers, dynamic and static random access memories (DRAM and SRAM), DRAM and SRAM controllers, a flash memory and controller, a controller area network (CAN) and a local interconnect network (LIN). For example, if the MCU is used for displaying vehicle data such as tire pressure, and cabin and ambient temperatures on a multi-information display, the multiple processor cores communicate with the DRAM in which an operating system is stored, and a flash memory in which the vehicle data is stored. The flash memory receives the vehicle data from components external to the MCU by way of the peripherals such as the CAN and the LIN, which manage communications between the flash memory and the external components. The multiple processor cores control the CAN and the LIN to enable communications.

To reduce the overall power consumed, the MCU is operable in multiple power modes like high and low power modes. For example, when the automobile is parked and powered off (i.e., not in use), applications such as radio, power windows and the multi-information display, are not required. Thus, to reduce power consumption of the MCU, the MCU operates in the low power mode and the multiple processor cores and the peripherals that handle the aforementioned applications (i.e., the DRAM controller, the DRAM, the flash memory and controller, and the CAN and the LIN) are powered off. However, peripherals such as the timers, the SRAM controller and the SRAM are active because they are used to retain an operating state of the MCU. Such peripherals are classified as being in a low power domain. Since the multiple processor cores are power-gated in the low power mode, the low power domain is left without control.

When the applications such as the multi-information display, the radio and the power-windows are needed, the MCU exits the low power mode and begins operating in the high power mode. The multiple processor cores and the peripherals (i.e., the DRAM controller, the DRAM, the flash memory and controller, and the CAN and the LIN) then are powered on, and classified as being high power domains. The multiple processor cores control the peripherals in the high and low power domains in the high power mode. However, in the high power mode, since both the high and low power domains are operational, the power consumption of the MCU is high.

When the MCU is in the high power mode, the high and low power domains receive a first supply voltage from a first voltage regulator. When the MCU is in the low power mode, the first voltage regulator is powered off and a second voltage regulator is turned on, and the low power domain is disconnected from the first voltage regulator and connected to the second voltage regulator using a switch. Thus, when the MCU is in the low power mode, it is not possible to control the components of the low power domain. Further, if only the CAN and the LIN are required to be active, the entire high power domain must be powered and the MCU has to toggle between the low and high power modes, which increases the average power consumption of the MCU. Since the MCU receives power from the car battery, the increased average power consumption drains the battery faster.

Therefore it would be advantageous to have a microcontroller that operates in multiple power modes including high and low power modes, but allows for controlled operation in the low power mode, and yet has low average power consumption.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
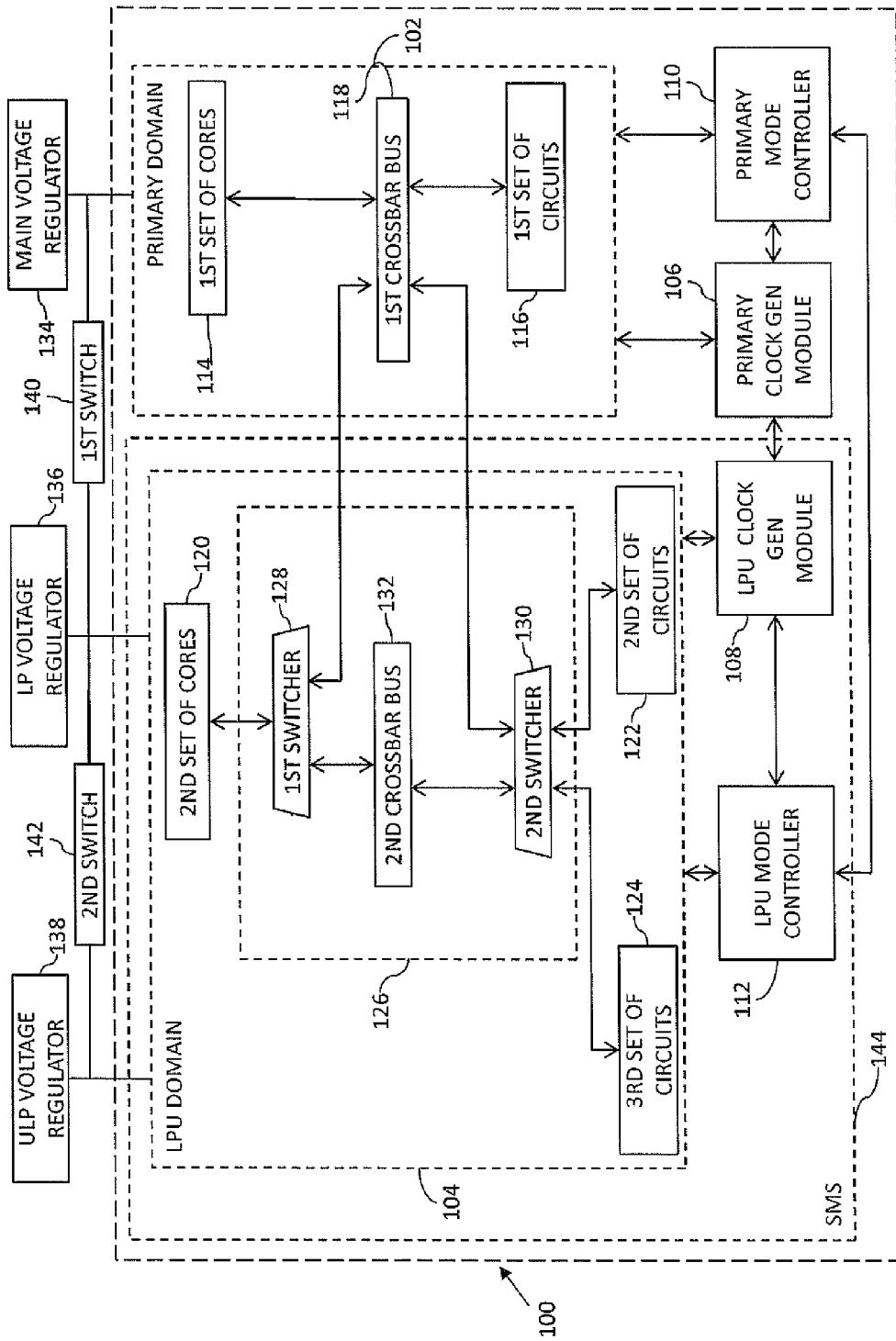
FIG. 1 is a schematic block diagram of a microcontroller that operates in multiple power modes in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a microcontroller that is operable in a high power mode and a low power unit (LPU) run mode is provided. The microcontroller comprises primary and LPU domains. The primary domain includes a first set of circuits, a first set of cores (i.e., core processors), and a first cross-bar bus. The LPU domain includes second and third sets of circuits, a second set of cores, and a switching module. The first set of cores operates when the microcontroller is in the high power mode and is powered off when the microcontroller is in the LPU run mode. The first cross-bar bus is connected between the first set of cores and the first set of circuits and configures a connection between the first set of cores and the first set of circuits. The second set of cores operates when the microcontroller is in the high power and LPU run modes. The switching module is connected to the second set of cores, the first cross-bar bus, and the second and third sets of circuits. The switching module connects the second set of cores to at least one of the first, second and third sets of circuits by way of the first cross-bar bus when the microcontroller is in the high power mode, and connects the second set of cores directly to at least one of the second and third sets of circuits when the integrated circuit is in the LPU run mode.

In another embodiment of the present invention, a microcontroller operable in high power and low power unit (LPU) run modes is provided. The microcontroller comprises first, second and third sets of circuits, first and second sets of cores (i.e., core processors), first and second cross-bar buses, and first and second switchers. The first set of cores operates when the microcontroller is in the high power mode and is powered off when the microcontroller is in the LPU run mode, while the second set of cores operates in both the high power and LPU run modes. The first cross-bar bus is connected between the first set of cores and the first set of circuits, and to the first and second switchers. The first cross-bar bus configures a connection between the first set of cores and the first set of circuits. The first switcher is connected to the second set of cores, and the first and second cross-bar buses. The first switcher connects the second set of cores to the first set of circuits by way of the first cross-bar bus when the microcontroller is in the high power mode and disconnects the second set of cores from the first cross-bar bus when the microcontroller is in the LPU run mode. The second cross-bar bus is connected to the first and second switchers. The first switcher disconnects the second set of cores from the second cross-bar bus when the microcontroller is in the high power mode and connects the second set of cores to the second cross-bar bus when the microcontroller is in the LPU run mode. The second switcher is connected to the first and second cross-bar buses and the second and third sets of circuits. The second switcher connects the second set of cores to at least one of the second and third sets of circuits by way of the first switcher and the first cross-bar bus, and the first set of cores to at least one of the second and third sets of circuits by way of the first cross-bar bus when the microcontroller is in the high power mode. The second switcher further connects the second set of cores to at least one of the second and third sets of circuits by way of the first switcher and the second cross-bar bus when the microcontroller is in the LPU run mode.

In yet another embodiment of the present invention, a method for configuring a power mode of a microcontroller having primary and low power unit (LPU) domains is provided. The microcontroller is operable in high power and low power unit (LPU) run modes, and comprises primary and LPU clock generator modules, and primary and LPU mode controllers. The primary domain includes a first set of circuits and a first set of cores. The LPU domain includes second and third sets of circuits, and a second set of cores. The primary and LPU clock generator modules generate first and second clock signals, respectively, and the primary and LPU mode controllers generate first and second sets of control signals, respectively. The method includes receiving a command to transition the microcontroller from the high power mode to the LPU run mode. The first clock signal and the first set of control signals provided to the primary domain are gated to de-activate the primary domain. The first clock signal and the first set of control signals provided to the LPU clock generator module and the LPU mode controller are gated. The second clock signal and the second set of control signals are provided to the second and third sets of circuits to activate and configure the second and third sets of circuits. The primary domain is powered off and the control of the LPU domain is transferred from the primary mode controller to the LPU mode controller. The LPU domain is disconnected from the primary domain by way of a switching module.

Various embodiments of the present invention provide a microcontroller that operates in high power and low power unit (LPU) run modes. The microcontroller includes primary and LPU domains. The primary domain includes a first set of circuits, a first set of cores, and a first cross-bar bus. The LPU domain includes second and third sets of circuits, a second set of cores, and a switching module. In one embodiment, the second set of circuits includes components such as a controller area network (CAN) and a local interconnect network (LIN) that facilitate communication between the MCU and external components. The first set of cores is active when the integrated circuit is in the high power mode and is powered off when the integrated circuit is in the LPU run mode. The first cross-bar bus configures a connection between the first set of cores and the first set of circuits. The second set of cores is active in both the high power and LPU run modes of the integrated circuit. The switching module connects the second set of cores to at least one of the first, second and third sets of circuits by way of the first cross-bar bus when the integrated circuit is in the high power mode, and connects the second set of cores directly to at least one of the second and third sets of circuits when the integrated circuit is in the LPU run mode. Thus, in the LPU run mode, the first set of cores and the first set of circuits are powered off and the second set of cores control the second set of circuits that include the CAN and the LIN. Therefore, the integrated circuit provides a controlled operation for components such as the CAN and the LIN when the integrated circuit is in the LPU run mode (which is a low power mode), thereby reducing power consumption of the integrated circuit and increasing the battery life of a battery that powers the integrated circuit.

Referring now to FIG. 1, a schematic block diagram of an integrated circuit (IC) 100 in accordance with an embodiment of the present invention is shown. The IC 100 is operable in multiple power modes. The IC also has a primary power domain 102 and a low power unit (LPU) domain 104, primary and LPU clock generator modules 106 and 108, and primary and LPU mode controllers 110 and 112.

The primary domain 102 includes a first set of cores 114, a first set of circuits 116 and a first cross-bar bus 118. The first cross-bar bus 118 is connected between the first set of circuits 116 and the first set of cores 114. The first set of circuits 116 includes components that require high power when active, examples of which include a flash controller, a flash memory, a dynamic random-access memory (DRAM) and a DRAM controller (all not shown). The first cross-bar bus 118 configures a connection between the first set of cores 114 and the first set of circuits 116. The first set of cores 114 sends commands to the first set of circuits 116 by way of the first cross-bar bus 118 to perform various functions such as storing and retrieving data from the DRAM and the flash memory using the DRAM and flash controllers, respectively.

The LPU domain 104 includes a second set of cores 120, second and third sets of circuits 122 and 124 and a switching module 126. The switching module 126 is connected between the second set of cores 120, the second and third sets of circuits 122 and 124, and the first cross-bar bus 118. The second set of circuits 122 includes components that consume less power when active as compared to the components in the first set of circuits 116. In one embodiment, the second set of circuits 122 includes a controller area network (CAN), a local interconnect network (LIN) and a static random-access memory (SRAM) controller (all not shown). The third set of circuits 124 includes components that consume the least power when active as compared to the components in the first and second sets of circuits 116 and 122. In one embodiment, the third set of circuits 124 includes components such as a SRAM and timer circuits (not shown).

The switching module 126 includes first and second switchers 128 and 130, and a second cross-bar bus 132. The first switcher 128 is connected to the second set of cores 120, and the first and second cross-bar buses 118 and 132. The second cross-bar bus 132 is connected between the first and second switchers 128 and 130. The second switcher 130 is connected to the second and third sets of circuits 122 and 124, and the first cross-bar bus 118. The switching module 126 connects the second set of cores 120 to the first, second and third sets of circuits 116, 122 and 124 and enables the second set of cores 120 to perform various functions such as storing and retrieving data from the DRAM, the SRAM and the flash memory using the DRAM, SRAM and flash controllers, respectively, and controlling and operating the CAN, the LIN and the timers. The switching module 126 further connects the first set of cores 114 to the second and third sets of circuits 122 and 124 by way of the first cross-bar bus 118 and the second switcher 130. It will be apparent to those of skill in the art that the switching module 126 may perform the aforementioned functions using different implementations such as a monolithic switch, a single switch that is included in the LPU domain 104, or a set of switches in a cascade arrangement that use a master-slave configuration between the switchers or the cross-bar buses of the primary and LPU domains 102 and 104.

The primary clock generator module 106 is connected to the primary domain 102 and the LPU domain 104 by way of the LPU clock generator module 108. The primary clock generator module 106 generates and provides a first clock signal to the primary domain 102. The primary clock generator module 106 may include a phase-locked loop (PLL, not shown) that generates the first clock signal and a first set of switches (not shown) that gates the first clock signal provided to the primary domain 102. The LPU clock generator module 108 is connected between the LPU domain 104 and the primary clock generator module 106. The LPU clock generator module 108 generates and provides a second clock signal to the LPU domain 104. The LPU clock generator module 108 may include at least one of an external oscillator (XOSC, not shown) and an internal oscillator (IRC, not shown) for generating the second clock signal and a second set of switches (not shown) that gates the second clock signal provided to the components within the LPU domain 104 based on the power mode of the IC 100. The LPU clock generator module 108 further includes a first bypass circuitry (not shown) that deactivates the LPU clock generator module 108 and propagates the first clock signal to the LPU domain 104. The control of clocking the primary and LPU domains 102 and 104 toggles between the primary and LPU clock generator modules 106 and 108, and hence, the primary and LPU clock generator modules 106 and 108 form a hierarchical clocking system.

The primary mode controller 110 is connected to the LPU domain 104 by way of the LPU mode controller 112, the primary domain 102, and the primary clock generator module 106. The primary mode controller 110 receives mode transition commands to initiate transitions of the IC 100 between multiple power modes. In one embodiment, the mode transition commands are generated by a boot program that runs on one of the first and second sets of cores 114 and 120. In another embodiment, the mode transition commands are generated based on events external to the IC 100. For instance, if the IC 100 is used in an automobile, the mode transition commands may be generated based on a key-off or key-on event. The primary mode controller 110 generates and provides a first set of control signals to configure the primary domain 102 and the primary clock generator module 106. In one embodiment, the first set of control signals include commands that configure the components within the primary domain 102 and the primary clock generator module 106 to a predetermined state based on the power mode of the IC 100. The predetermined state corresponds to an operation state of the components within the primary domain 102. The first set of control signals may also include handshake signals that transfer controls between various components of the primary and LPU domains 102 and 104, the primary and LPU clock generator modules 106 and 108, and the primary and LPU mode controllers 110 and 112. The LPU mode controller 112 is connected between the LPU domain 104 and the primary mode controller 110, and to the LPU clock generator module 108. The LPU mode controller 112 receives the mode transition commands to initiate transitions of the IC 100 between the multiple power modes. The LPU mode controller 112 generates and provides a second set of control signals to configure the LPU domain 104 and the LPU clock generator module 108. The second set of control signals is similar to the first set of control signals. The LPU mode controller 112 includes a second bypass circuitry (not shown) that deactivates the LPU mode controller 112 and propagates the first set of control signals to the LPU domain 104. The control of configuring the primary and LPU domains 102 and 104 toggles between the primary and LPU mode controllers 110 and 112, and hence, the primary and LPU mode controllers 110 and 112 form a hierarchical mode control system.

The IC 100 is operable in high power, LPU run, LPU sleep, LPU stop and LPU standby modes. The IC 100 is connected to main, low-power, and ultra-low-power voltage regulators 134, 136 and 138. The main, low-power, and ultra-low-power voltage regulators 134, 136 and 138 are voltage regulators external to the IC 100 and power the components of the IC 100 based on the power mode of the IC 100. A first switch 140 is connected between the main and the low-power voltage regulators 134 and 136. A second switch 142 is connected between the low-power and the ultra-low-power voltage regulators 136 and 138. The main, low-power, and ultra-low-power voltage regulators 134, 136 and 138 are connected to a battery (not shown) for receiving a primary supply voltage.

In operation, when the IC 100 is in the high power mode, the main voltage regulator 134 is powered on and the low-power and ultra-low power voltage regulators 136 and 138 are powered off. The first and second switches 140 and 142 are closed. Thus, the main voltage regulator 134 is connected to the primary and LPU domains 102 and 104, the primary and LPU clock generator modules 106 and 108, and the primary and LPU mode controllers 110 and 112 for supplying power thereto. The low-power and ultra-low power voltage regulators 136 and 138 are not powered off when the IC 100 is in the high power mode. The first switcher 128 connects the second set of cores 120 to the first cross-bar bus 118 and disconnects the second set of cores 120 from the second cross-bar bus 132. The second switcher 130 connects the first cross-bar bus 118 to the second and third sets of circuits 122 and 124, and disconnects the second cross-bar bus 132 from the second and third sets of circuits 122 and 124. Thus, the switching module 126 connects the first set of cores 114 to the second and third sets of circuits 122 and 124 by way of the first cross-bar bus 118 and the second switcher 130. The switching module 126 further connects the second set of cores 120 to the first set of circuits 116 by way of the first switcher 128 and the first cross-bar bus 118 and to the second and third sets of circuits 122 and 124 by way of the first and second switchers 128 and 130, and the first cross-bar bus 118. The first bypass circuitry deactivates the LPU clock generator module 108 and the second bypass circuitry deactivates the LPU mode controller 112. The primary mode controller 110 provides the first set of control signals to the primary clock generator module 106, the primary domain 102 and the LPU domain 104 by way of the second bypass circuitry and configures the primary and LPU domains 102 and 104, and the primary clock generator module 106 in a predetermined state corresponding to the high power mode of the IC 100. Upon configuring, the primary clock generator module 106 provides the first clock signal to the LPU domain 104 by way of the first bypass circuitry. Note that "upon configuring" means when the primary mode controller is in high power mode. This occurs whenever the IC 100 is operating in high power mode and the primary mode controller is in charge of device configuration.

When the primary mode controller 110 receives a command to initiate transition of the IC 100 from the high power mode to the LPU run mode, the LPU mode controller 112 is activated. In the LPU run mode, the primary mode controller 110 configures the primary clock generator module 106 to gate the first clock signal provided to the primary domain 102, thereby deactivating the primary domain 102. The primary mode controller 110 further configures the primary clock generator module 106 to transfer the control of clocking the LPU domain 104 to the LPU clock generator module 108. The primary mode controller 110 then transfers the control of configuring the LPU domain 104 and the LPU clock generator module 108 to the LPU mode controller 112. The LPU mode controller 112 configures the LPU clock generator module 108 to provide the second clock signal to the second and third sets of circuits 122 and 124. The second and third sets of circuits 122 and 124 are not power-gated, and hence, operate seamlessly during the transfer of the clock and mode configuration controls. The LPU mode controller 112 further provides the second set of control signals to the second and third sets of circuits 122 and 124 to configure the second and third sets of circuits 122 and 124 in to a predetermined state corresponding to the LPU run mode of the IC 100. The first switcher 128 disconnects the second set of cores 120 from the first cross-bar bus 118 and connects the second set of cores 120 to the second cross-bar bus 132. The second switcher 130 disconnects the first cross-bar bus 118 from the second and third sets of circuits 122 and 124, and connects the second cross-bar bus 132 to the second and third sets of circuits 122 and 124. Thus, the second set of cores 120 are connected to the second and third sets of circuits 122 and 124 by way of the first and second switchers 128 and 130, and the second cross-bar bus 132, and the LPU domain 104 is isolated from the primary domain 102. The low-power voltage regulator 136 is powered on and the main and ultra-low-power voltage regulators 134 and 138 are powered off. The first switch 140 is opened and second switch 142 is closed. Thus, the low-power voltage regulator 136 is disconnected from the primary domain 102, the primary clock generator module 106 and the primary mode controller 110. As a result, the primary domain 102, the primary clock generator module 106 and the primary mode controller 110 are powered off.

Thus, when the IC 100 is in the LPU run mode, the primary domain 102, the primary clock generator module 106, and the primary mode controller 110 are powered off and the LPU domain 104, the LPU clock generator module 108, and the LPU mode controller 112 are active and hence, the power consumption of the IC 100 is less in the LPU run mode as compared to when in the high power mode. The LPU domain 104, the LPU clock generator module 108, and the LPU mode controller 112 form a small microcontroller system 144. Since the second set of cores 120 can control the second set of circuits 122, the small microcontroller system 144 provides a controlled power mode for components such as the CAN and the LIN when the IC 100 is in the LPU run mode (which is a low power mode). Therefore, power consumption is reduced and the battery life increases. The LPU sleep, LPU stop and LPU standby modes of the IC 100 are additional low power modes of the small microcontroller system 144 in which the small microcontroller system 144 is power-gated and clock-gated based on the power mode of the IC 100.

When the LPU mode controller 112 receives a command to initiate transition of the IC 100 from the LPU run mode to the LPU sleep mode, the LPU mode controller 112 configures the LPU clock generator module 108 to gate the second clock signal provided to the second set of cores 120, thereby deactivating the second set of cores 120. The LPU mode controller 112 provides the second set of control signals to the second and third sets of circuits 122 and 124 to configure the second and third sets of circuits 122 and 124 in to a predetermined state corresponding to the LPU sleep mode of the IC 100. The LPU mode controller 112 further configures the LPU clock generator module 108 to provide the second clock signal to the second and third sets of circuits 122 and 124.

When the LPU mode controller 112 receives a command to initiate transition of the IC 100 from the LPU run mode to the LPU stop mode, the LPU mode controller 112 configures the LPU clock generator module 108 to gate the second clock signal provided to the LPU domain 104, thereby deactivating the LPU domain 104. However, the LPU domain 104 continues to be powered by the low-power voltage regulator 136 and hence, operational states of the second set of cores 120, and the second and third sets of circuits 122 and 124 are retained.

When the LPU mode controller 112 receives a command to initiate transition of the IC 100 from the LPU run mode to the LPU standby mode, the LPU mode controller 112 configures the LPU clock generator module 108 to gate the second clock signal provided to the second set of cores 120 and the second and third sets of circuits 122 and 124 to deactivate the second set of cores 120 and the second and third sets of circuits 122 and 124. The second set of cores 120 and the second set of circuits 122 are power-gated in the LPU standby mode, and hence, powered off. The ultra-low power voltage regulator 138 is powered on and the main and low-power voltage regulators 134 and 136 are powered off. The first and second switches 140 and 142 are opened. Thus, ultra-low power voltage regulator 138 is disconnected from the primary domain 102, the first and second sets of circuits 116 and 122, the primary clock generator module 106, and the primary mode controller 110, and powers the third set of circuits 124, the LPU clock generator module 108, and the LPU mode controller 112. The LPU mode controller 112 provides the second set of control signals to the third set of circuits 124 to configure the third sets of circuits 124 to a predetermined state corresponding to the LPU standby mode of the IC 100. The LPU mode controller 112 further configures the LPU clock generator module 108 to provide the second clock signal to the third set of circuits 124.

When the IC 100 is in the LPU standby mode, the second set of circuits 122, and the second set of cores 120 are powered off and the third set of circuits 124, the LPU clock generator module 108 and the LPU mode controller 112 are active and hence, the power consumption of the IC 100 is least. Therefore, power consumption of the IC 100 is further reduced, which allows the battery to maintain its charge longer.

When the LPU mode controller 112 receives a command to initiate transition of the IC 100 from the LPU run mode to the high power mode, the low-power voltage regulator 136 is powered off and the main voltage regulator 134 is powered on. The first and second switches 140 and 142 are closed. Thus, the main voltage regulator 134 is connected to the primary and LPU domains 102 and 104, the primary and LPU clock generator modules 106 and 108, and the primary and LPU mode controllers 110 and 112, and powers the primary and LPU domains 102 and 104, the primary and LPU clock generator modules 106 and 108, and the primary and LPU mode controllers 110 and 112. The first switcher 128 connects the second set of cores 120 to the first cross-bar bus 118 and disconnects the second set of cores 120 from the second cross-bar bus 132. The second switcher 130 connects the first cross-bar bus 118 to the second and third sets of circuits 122 and 124, and disconnects the second cross-bar bus 132 from the second and third sets of circuits 122 and 124. Thus, the switching module 126 connects the first set of cores 114 to the second and third sets of circuits 122 and 124 by way of the first cross-bar bus 118 and the second switcher 130. The switching module 126 further connects the second set of cores 120 to the first set of circuits 116 by way of the first switcher 128 and the first cross-bar bus 118 and to the second and third sets of circuits 122 and 124 by way of the first and second switchers 128 and 130, and the first cross-bar bus 118. Since the primary mode controller 110 is powered on in the high power mode, the primary mode controller 110 configures the primary domain 102. The primary mode controller 110 further configures the primary clock generator module 106 to provide the first clock signal to the primary domain 102. Thus, the primary domain 102 is activated and configured to operate in the high power mode. The LPU mode controller 112 configures the LPU clock generator module 108 to transfer the control of clocking the LPU domain 104 to the primary clock generator module 106. The LPU mode controller 112 then transfers the control of configuring the LPU domain 104 to the primary mode controller 110. The primary mode controller 110 provides the first set of control signals to the LPU domain 104 and configures the LPU domain 104 to the predetermined state corresponding to the high power mode of the IC 100. The primary mode controller 110 further configures the primary clock generator module 106 to provide the first clock signal to the LPU domain 104 to activate the LPU domain 104.

It will be apparent to those of skill in the art that the IC 100 can transition between any one of the high power, LPU run, LPU stop, LPU sleep and LPU standby modes.

In an embodiment of the present invention, the IC 100 further includes an internal memory (not shown) that stores a plurality of boot vectors associated with the first and second sets of cores 114 and 120. Each boot vector of the represents a location that indicates a first instruction to be executed by a core of the first and second set of cores 114 and 120 when the first and second set of cores 114 and 120 are powered on. When the IC 100 is in the high power mode, the primary mode controller 110 controls the plurality of boot vectors. When the IC 100 transitions from the LPU run mode to the high power mode, the primary mode controller 110 allows any of the first set of cores 114 to boot from any of the plurality of boot vectors. When the IC 100 is in the LPU run, stop, sleep, and standby modes, the LPU mode controller 112 controls the boot vectors. When the IC 100 transitions from the LPU standby mode to the LPU run mode, the LPU mode controller 112 allows any core of the second set of cores 120 to boot from any of the boot vectors. Thus, the IC 100 enables control over the operational state of the at least one of the first and second set of cores 114 and 120.

Figure 2A:
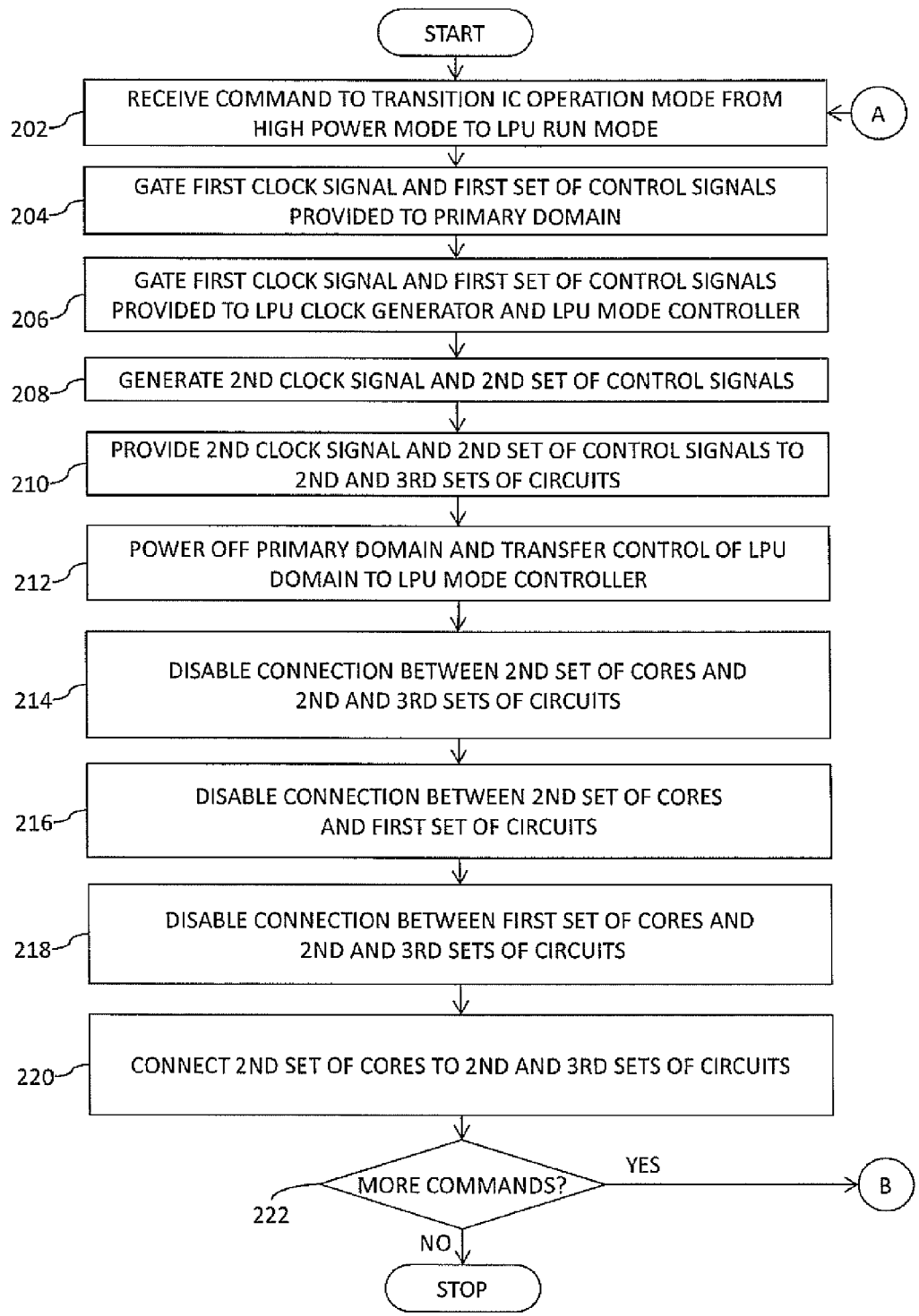
FIGS. 2A-2C are a flow chart illustrating a method for configuring the microcontroller of FIG. 1 in multiple power modes in accordance with an embodiment of the present invention.
Figure 2B:
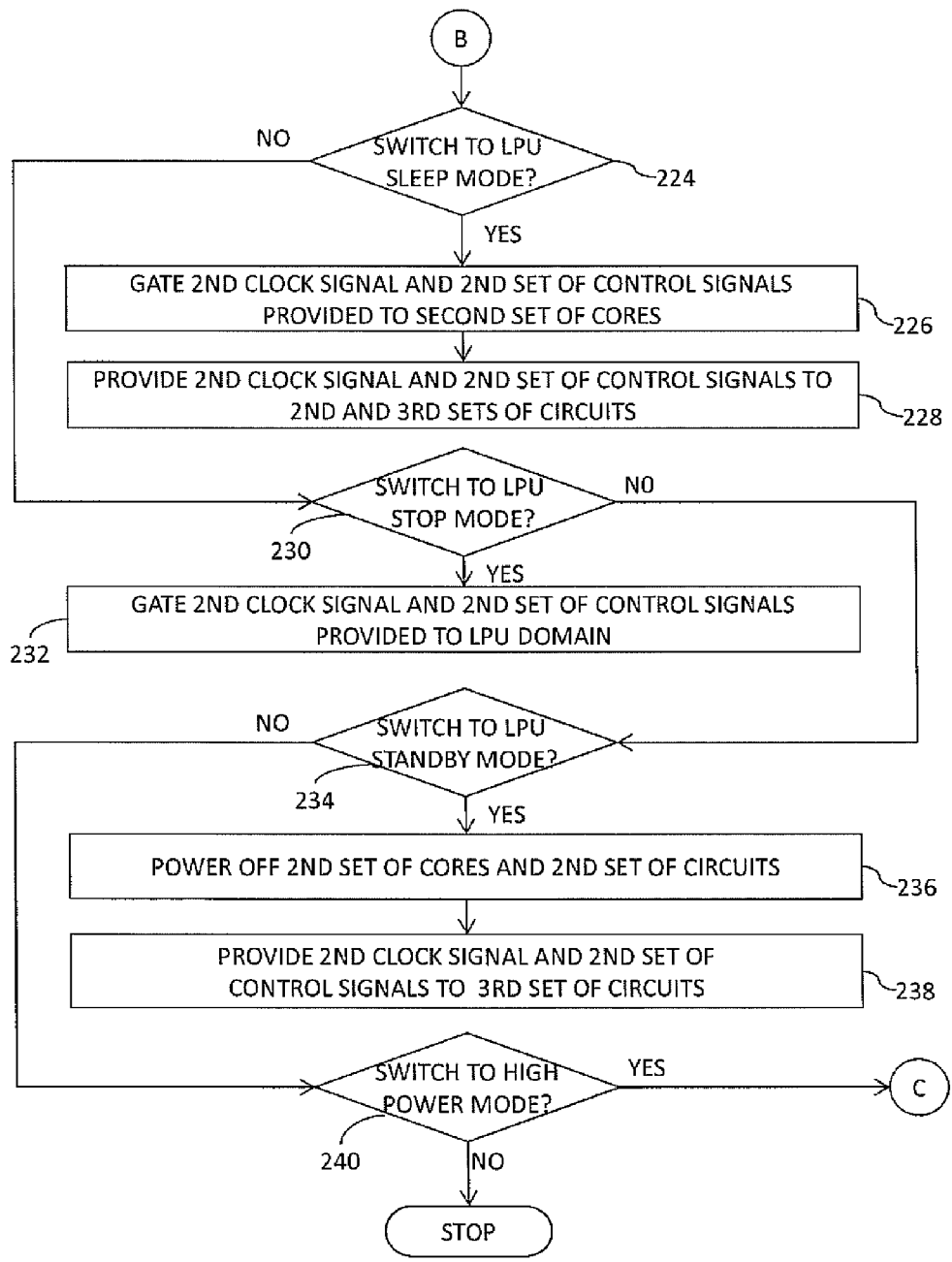
Figure 2C:
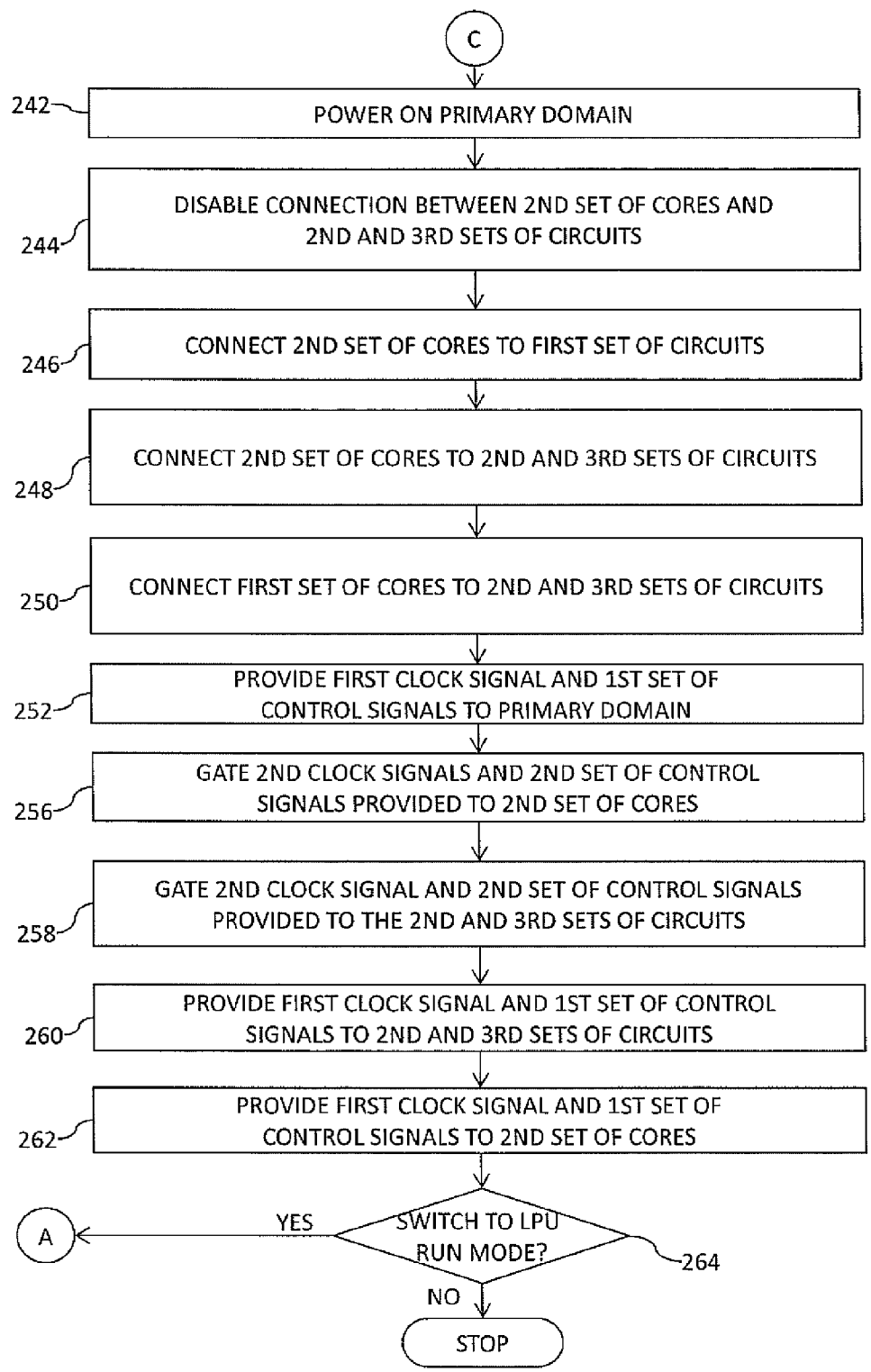

Referring now to FIGS. 2A, 2B and 2C, a flowchart illustrating a method for configuring a power mode of the IC 100 of FIG. 1 in accordance with an embodiment of the present invention is shown. At step 202, the primary mode controller 110 receives a command to transition the IC 100 from the high power mode to the LPU run mode. At step 204, the primary clock generator module 106 gates the first clock signal provided to the primary domain 102 to initiate the transfer of the control of clocking the LPU domain 104 to the LPU clock generator module 108 from the primary clock generator module 106. Further at step 204, the primary mode controller 110 gates the first set of control signals provided to the primary domain 102. At step 206, the primary clock generator module 106 gates the first clock signal provided to the second and third sets of circuits 122 and 124. Further at step 206, the primary mode controller 110 gates the first set of control signals provided to the second and third sets of circuits 122 and 124. At step 208, the LPU clock generator module 108 generates the second clock signal and the LPU mode controller 112 generates the second set of control signals. At step 210, the second clock signal and the second set of control signals is provided to the second and third sets of circuits 122 and 124. At step 212, the primary domain 102 is powered off and the control of the LPU domain 104 is transferred from the primary mode controller 110 to the LPU mode controller 112. At step 214, the switching module 126 disables a connection between the second set of cores 120 and the second and third sets of circuits 122 and 124 that were connected by way of the first and second switchers 128 and 130, and the first cross-bar bus 118. At step 216, the switching module 126 disables a connection between the second set of cores 120 and the first set of circuits 116 that were connected by way of the first switcher 128 and the first cross-bar bus 118. At step 218, the switching module 126 disables a connection between the first set of cores 114 and the second and third sets of circuits 122 and 124 that were connected by way of the first cross-bar bus 118 and the second switcher 130. At step 220, the switching module 126 connects the second set of cores 120 to the at least one of the second and third sets of circuits 122 and 124 by way of the first and second switchers 128 and 130, and the second cross-bar bus 132. At step 222, the LPU mode controller 112 checks for subsequent incoming commands for mode transition of the IC 100. If at step 222, the LPU mode controller 112 determines that a command for mode transition of the IC 100 is received, step 224 is executed.

At step 224, the LPU mode controller 112 checks whether a command to transition the IC 100 from the LPU run mode to the LPU sleep mode is received. If the LPU mode controller 112 determines that the command to transition the IC 100 from the LPU run mode to the LPU sleep mode is received at step 224, step 226 is executed. At step 226, the LPU clock generator module 108 gates the second clock signal provided to the second set of cores 120. Further at step 226, the LPU mode controller 112 gates the second set of control signals provided to the second set of cores 120. At step 228, the LPU clock generator module 108 provides the second clock signal to the second and third sets of circuits 122 and 124 and the LPU mode controller 112 provides the second set of control signals to the second and third sets of circuits 122 and 124. If the LPU mode controller 112 determines that the command to transition the IC 100 from the LPU run mode to the LPU sleep mode is not received at step 224, step 230 is executed.

At step 230, the LPU mode controller 112 checks whether a command to transition the IC 100 from the LPU run mode to the LPU stop mode is received. If the LPU mode controller 112 determines that the command to transition the IC 100 from the LPU run mode to the LPU stop mode is received at step 230, step 232 is executed. At step 232, the LPU clock generator module 108 gates the second clock signal provided to the LPU domain 104. Further at step 232, the LPU mode controller 112 gates the second set of control signals provided to the LPU domain 104. If the LPU mode controller 112 determines that the command to transition the IC 100 from the LPU run mode to the LPU stop mode is not received at step 230, step 234 is executed.

At step 234, the LPU mode controller 112 checks whether a command to transition the IC 100 from the LPU run mode to the LPU standby mode is received. If the LPU mode controller 112 determines that the command to transition the IC 100 from the LPU run mode to the LPU standby mode is received at step 234, step 236 is executed. At step 236, the second set of cores 120 and the second set of circuits 122 are powered off. At step 238, the LPU clock generator module 108 provides the second clock signal to the third set of circuits 124. Further at step 238, the LPU mode controller 112 provides the second set of control signals to the third set of circuits 124. If the LPU mode controller 112 determines that the command to transition the IC 100 from the LPU run mode to the LPU standby mode is not received at step 234, step 240 is executed.

At step 240, the LPU mode controller 112 checks whether a command to transition the IC 100 from the LPU run mode to the high power mode is received. If the LPU mode controller 112 determines that the command to transition the IC 100 from the LPU run mode to the high power mode is received at step 240, step 242 is executed.

At step 242, the primary domain 102 is powered on. At step 244, the switching module 126 disables a connection between the second set of cores 120 and the second and third sets of circuits 122 and 124 that were connected by way of the first and second switchers 128 and 130, and the second cross-bar bus 132. At step 246, the switching module 126 connects the second set of cores 120 to the first set of circuits 116 by way of the first switcher 128 and the first cross-bar bus 118. At step 248, the switching module 126 connects the second set of cores 120 to the at least one of the second and third sets of circuits 122 and 124 by way of the first and second switchers 128 and 130, and the first cross-bar bus 118. At step 250, the switching module 126 connects the first set of cores 114 to the second and third sets of circuits 122 and 124 by way of the first cross-bar bus 118 and the second switcher 130. At step 252, the primary clock generator module 106 provides the first clock signal to the primary domain 102. Further at step 252, the primary mode controller 110 provides the first set of control signals to the primary domain 102. At step 256, the LPU clock generator module 108 gates the second clock signal provided to the second set of cores 120. Further at step 256, the LPU mode controller 112 gates the second set of control signals provided to the second set of cores 120. At step 258, the LPU clock generator module 108 gates the second clock signal provided to the second and third sets of circuits 122 and 124. Further at step 258, the LPU mode controller 112 gates the second set of control signals provided to the second and third sets of circuits 122 and 124. At step 260, the primary clock generator module 106 provides the first clock signal to the second and third sets of circuits 122 and 124. Further at step 260, the primary mode controller 110 provides the first set of control signals to the second and third sets of circuits 122 and 124. At step 262, the primary clock generator module 106 provides the first clock signal to the second set of cores 120. Further at step 262, the primary mode controller 110 provides the first set of control signals to the second set of cores 120.

At step 264, the primary mode controller 110 checks whether a command to transition the IC 100 from the high power mode to the LPU run mode is received. If the primary mode controller 110 determines that the command to transition the IC 100 from the high power mode to the LPU run mode is received at step 264, step 202 is executed.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An integrated circuit (IC) operable in a high power mode and a low power unit (LPU) run mode, comprising:
    a primary domain including:
        a first set of circuits;
        a first set of cores having at least one core that operates when the IC is in the high power mode and is powered off when the IC is in the LPU run mode; and
        a first cross-bar bus, connected between the first set of cores and the first set of circuits, that configures a connection between the first set of cores and the first set of circuits; and
    a LPU domain including:
        second and third sets of circuits;
        a second set of cores having at least one core that operates when the integrated circuit is in the high power and LPU run modes; and
        a switching module, connected to the second set of cores, the first cross-bar bus, and the second and third sets of circuits, that connects the second set of cores to at least one of the first, second and third sets of circuits by way of the first cross-bar bus when the IC is in the high power mode, and connects the second set of cores directly to at least one of the second and third sets of circuits when the IC is in the LPU run mode.

2. The IC of claim 1, wherein the switching module further connects the first set of cores to the at least one of the second and third sets of circuits by way of the first cross-bar bus when the IC is in the high power mode, and disables a connection between the second set of cores and at least one of the first, second and third sets of circuits by way of the first cross-bar bus when the IC is in the LPU run mode.

3. The IC of claim 2, wherein the switching module comprises:
    a first switcher, connected to the second set of cores and the first cross-bar bus, that connects the second set of cores to the first cross-bar bus when the IC is in the high power mode and disconnects the second set of cores from the first cross-bar bus when the IC is in the LPU run mode;
    a second cross-bar bus, connected to the first switcher, wherein the first switcher disconnects the second set of cores from the second cross-bar bus when the IC is in the high power mode and connects the second set of cores to the second cross-bar bus when the IC is in the LPU run mode; and
    a second switcher, connected to the first and second cross-bar buses and the second and third sets of circuits, that connects the first set of cores to at least one of the second and third sets of circuits by way of the first cross-bar bus and the second set of cores to the at least one of the second and third sets of circuits by way of the first switcher and the first cross-bar bus when the IC is in the high power mode, and connects the second set of cores to the at least one of the second and third sets of circuits by way of the first switcher and the second cross-bar bus when the IC is in the LPU run mode.

4. The IC of claim 3, wherein the IC also is operable in a LPU sleep mode, a LPU stop mode, and a LPU standby mode, and wherein the primary domain is powered on when the IC is in the high power mode and is powered off when the IC is in any one of the LPU run mode, LPU sleep mode, LPU stop mode and LPU standby mode.

5. The IC of claim 4, further comprising:
    a primary clock generator module, connected to the primary domain, that generates and provides a first clock signal to the primary domain when the IC is in the high power mode and is powered off when the IC is in any one of the LPU run, LPU sleep, LPU stop and LPU standby modes; and
    a LPU clock generator module, connected between the LPU domain and the primary clock generator module, that generates and provides a second clock signal to the LPU domain when the IC is in the LPU run mode and is deactivated when the IC is in the high power mode, wherein the primary clock generator module further provides the first clock signal to the LPU domain by way of the LPU clock generator module when the IC is in the high power mode.

6. The IC of claim 5, wherein the second clock signal provided to the second set of cores is gated and the LPU clock generator module provides the second clock signal to the second and third sets of circuits when the IC is in the LPU sleep mode, and wherein the second clock signal provided to the LPU domain is gated when the IC is in the LPU stop mode, and wherein the second set of cores and the second set of circuits are powered off and the LPU clock generator module provides the second clock signal to the third set of circuits when the IC is in the LPU standby mode.

7. The IC of claim 6, further comprising:
a primary mode controller, connected to the primary domain and the primary clock generator module, that generates and provides a first set of control signals to the primary domain and the primary clock generator module when the IC is in the high power mode and is powered off when the IC is in any one of the LPU run, LPU sleep, LPU stop and LPU standby modes; and
a LPU mode controller, connected to the LPU domain, the LPU clock generator module and the primary mode controller, that generates and provides a second set of control signals to the LPU domain and the LPU clock generator module when the IC is in any one of the LPU run, LPU sleep, LPU stop and LPU standby modes, and is deactivated when the IC is in the high power mode, and wherein the primary mode controller further provides the first set of control signals to the LPU domain by way of the LPU mode controller when the IC is in the high power mode.

8. The IC of claim 7, wherein the first set of control signals configures the primary clock generator module, and the primary and LPU domains when the IC is in the high power mode, and wherein the second set of control signals configures the LPU clock generator module and the LPU domain when the IC is in any one of the LPU run, LPU sleep, LPU stop and LPU standby modes.

9. The IC of claim 1, wherein the second set of circuits includes at least one of a controller area network (CAN) and a local interconnect network (LIN).

10. A microcontroller operable in high power and low power unit (LPU) run modes, comprising:
first, second and third sets of circuits;
first and second sets of cores each having at least one core, wherein the first set of cores operates when the microcontroller is in the high power mode and is powered off when the integrated circuit is in the LPU run mode, and wherein the second set of cores operates when the microcontroller is in the high power and LPU run modes;
a first cross-bar bus, connected between the first set of cores and the first set of circuits, that configures a connection between the first set of cores and the first set of circuits;
a first switcher, connected to the second set of cores and the first cross-bar bus, that connects the second set of cores to the first set of circuits by way of the first cross-bar bus when the microcontroller is in the high power mode and disconnects the second set of cores from the first cross-bar bus when the microcontroller is in the LPU run mode;
a second cross-bar bus, connected to the first switcher, wherein the first switcher disconnects the second set of cores from the second cross-bar bus when the microcontroller is in the high power mode and connects the second set of cores to the second cross-bar bus when the microcontroller is in the LPU run mode; and
a second switcher, connected to the first and second cross-bar buses and the second and third sets of circuits, that connects the second set of cores to at least one of the second and third sets of circuits by way of the first switcher and the first cross-bar bus and the first set of cores to the at least one of the second and third sets of circuits by way of the first cross-bar bus when the microcontroller is in the high power mode, and connects the second set of cores to the at least one of the second and third sets of circuits by way of the first switcher and the second cross-bar bus when the microcontroller is in the LPU run mode.

11. The microcontroller of claim 10, wherein the microcontroller is further operable in LPU sleep, LPU stop and LPU standby modes, and wherein the first set of cores and the first set of circuits are powered off when the microcontroller is in any one of the LPU run, LPU sleep, LPU stop and LPU standby modes.

12. The microcontroller of claim 11, further comprising:
a primary clock generator module, connected to the first set of cores and the first set of circuits, that generates and provides a first clock signal to the first set of cores and the first set of circuits when the microcontroller is in the high power mode and is powered off when the integrated circuit is in any one of the LPU run, LPU sleep, LPU stop and LPU standby modes; and
a LPU clock generator module, connected to the second set of cores, second and third sets of circuits, and the primary clock generator module, that generates and provides a second clock signal to the second set of cores, and the second and third sets of circuits when the microcontroller is in the LPU run mode and is deactivated when the microcontroller is in the high power mode, wherein the primary clock generator module further provides the first clock signal to the second set of cores, and second and third sets of circuits by way of the LPU clock generator module when the microcontroller is in the high power mode.

13. The microcontroller of claim 12, wherein the second clock signal provided to the second set of cores is gated and the LPU clock generator module provides the second clock signal to the second and third sets of circuits when the microcontroller is in the LPU sleep mode, and wherein the second clock signal provided to the second set of cores and the second and third sets of circuits is gated when the microcontroller is in the LPU stop mode, and wherein the second set of cores and the second set of circuits are powered off and the LPU clock generator module provides the second clock signal to the third set of circuits when the microcontroller is in the LPU standby mode.

14. The microcontroller of claim 13, further comprising:
a primary mode controller, connected to the first set of cores, the first set of circuits and the primary clock generator module, that generates and provides a first set of control signals to the first set of cores, the first set of circuits and the primary clock generator module to configure the first set of cores, the first set of circuits and the primary clock generator module when the microcontroller is in the high power mode and is powered off when the microcontroller is in any one of the LPU run, LPU sleep, LPU stop and LPU standby modes; and a LPU mode controller, connected to the second set of cores, and second and third sets of circuits, the LPU clock generator module and the primary mode controller, that generates and provides a second set of control signals to the second set of cores, and second and third sets of circuits and the LPU clock generator module to configure the second set of cores, and second and third sets of circuits and the LPU clock generator module when the microcontroller is in any one of the LPU run mode, LPU sleep, LPU stop and LPU standby modes and is deactivated when the microcontroller is in the high power mode, wherein the primary mode controller further provides the first set of control signals to the second set of cores, and second and third sets of circuits by way of the LPU mode controller to configure the second set of cores, and second and third sets of circuits when the microcontroller is in the high power mode.

15. A method for configuring a power mode of an integrated circuit having primary and low power unit (LPU) domains, wherein the primary domain includes a first set of cores having at least one core and a first set of circuits and the LPU domain includes a second set of cores having at least one core, and second and third sets of circuits, the method comprising:
receiving a command to transition the power mode of the integrated circuit from a high power mode to a LPU run mode;
gating a first clock signal and a first set of control signals provided to the primary domain to deactivate the primary domain, wherein the first clock signal and the first set of control signals are generated by a primary clock generator module and a primary mode controller, respectively;
gating the first clock signal and the first set of control signals provided to a LPU clock generator module and a LPU mode controller, respectively;
generating a second clock signal and a second set of control signals by the LPU clock generator module and the LPU mode controller, respectively;
providing the second clock signal and the second set of control signals to the second and third sets of circuits to activate and configure the second and third sets of circuits;
powering off the primary domain and transferring control of the LPU domain from the primary mode controller to the LPU mode controller; and
disconnecting the LPU domain from the primary domain by way of a switching module.

16. The method of claim 15, wherein disconnecting the LPU domain from the primary domain by way of the switching module comprises:
disabling a connection between the second set of cores and the second and third sets of circuits by way of first and second switchers, and a first cross-bar bus;
disabling a connection between the second set of cores and the first set of circuits by way of the first switcher and the first cross-bar bus;
disabling a connection between the first set of cores and the second and third sets of circuits by way of the first cross-bar bus and the second switcher; and
connecting the second set of cores to at least one of the second and third sets of circuits by way of the first and second switchers, and a second cross-bar bus.

17. The method of claim 16, further comprising:
receiving a command to transition the integrated circuit from the LPU run mode to a LPU sleep mode;
gating the second clock signal and the second set of control signals provided to the second set of cores to deactivate the second set of cores; and
providing the second clock signal and the second set of control signals to the second and third sets of circuits to activate and configure the second and third sets of circuits.

18. The method of claim 16, further comprising:
receiving a command to transition the integrated circuit from the LPU run mode to a LPU stop mode; and
gating the second clock signal and the second set of control signals provided to the LPU domain to deactivate the LPU domain.

19. The method of claim 15, further comprising:
receiving a command to transition the integrated circuit from the LPU run mode to a LPU standby mode;
powering off the second set of cores and the second set of circuits; and
providing the second clock signal and the second set of control signals to the third set of circuits to activate and configure the third set of circuits.

20. The method of claim 15, further comprising:
receiving a command to transition the integrated circuit from the LPU run mode to the high power mode;
powering on the primary domain;
connecting the primary domain to the LPU domain by way of the switching module;
providing the first clock signal and the first set of control signals to the primary domain to activate and configure the primary domain;
gating the second clock signal provided to the second set of cores to deactivate the second set of cores;
gating the second clock signal provided to the second and third sets of circuits to deactivate the second and third sets of circuits;
providing the first clock signal and the first set of control signals to the second and third sets of circuits to activate and configure the second and third sets of circuits; and
providing the first clock signal and the first set of control signals to the second set of cores to activate and configure the second set of cores.

21. The method of claim 20, wherein connecting the LPU domain to the primary domain by way of the switching module comprises:
disabling a connection between the second set of cores and the second and third sets of circuits by way of the first and second switchers, and the second cross-bar bus;
connecting the second set of cores to the first set of circuits by way of the first switcher and the first cross-bar bus;
connecting the second set of cores to at least one of the second and third sets of circuits by way of the first and second switchers, and the first cross-bar bus; and
connecting the first set of cores to the second and third set of circuits by way of the first cross-bar bus and the second switcher.

* * * * *